United States Patent [19]
Yamazaki

[11] Patent Number: 5,267,224
[45] Date of Patent: Nov. 30, 1993

[54] LIQUID CRYSTAL MEMORY DEVICE INCLUDING AN ORGANIC FERROELECTRIC LAYER

[75] Inventor: Shunpei Yamazaki, Tokyo, Japan

[73] Assignee: Semiconductor Energy Laboratory Co., Ltd., Kanagawa, Japan

[21] Appl. No.: 717,191

[22] Filed: Jun. 18, 1991

Related U.S. Application Data

[63] Continuation-in-part of Ser. No. 302,104, Jan. 25, 1989, abandoned, which is a continuation of Ser. No. 894,279, Aug. 7, 1986, abandoned.

[30] Foreign Application Priority Data

| Aug. 7, 1985 | [JP] | Japan | 60-173935 |
| Aug. 7, 1985 | [JP] | Japan | 60-173936 |
| Dec. 2, 1985 | [JP] | Japan | 60-271245 |

[51] Int. Cl.$^5$ ............ G11B 7/13; G11B 7/24; G11B 9/02; G11B 13/04
[52] U.S. Cl. ............ 369/13; 369/110; 369/100; 369/288; 365/108
[58] Field of Search ........... 369/13, 110, 100, 111, 369/288; 365/108, 117; 360/114, 59; 250/225; 350/350.3, 334, 335, 349, 351, 340, 341, 340

[56] References Cited

U.S. PATENT DOCUMENTS

| 4,405,993 | 9/1983 | Kahn et al. | 365/108 |
| 4,835,751 | 5/1989 | Yamazaki | 369/13 |
| 4,845,695 | 7/1989 | Yamazaki | 369/13 |
| 4,853,911 | 8/1989 | Yamazaki | 369/13 |

FOREIGN PATENT DOCUMENTS

| 55-455322 | 12/1980 | Japan . |
| 59-216126 | 12/1984 | Japan . |
| 60-178092 | 9/1985 | Japan . |
| 62-132249 | 6/1987 | Japan . |

*Primary Examiner*—Hoa Nguyen
*Attorney, Agent, or Firm*—Sixbey, Friedman, Leedom & Ferguson

[57] ABSTRACT

An improved liquid crystal device such as an optical disc memory or a display device with a ferroelectric liquid crystal (FLC) is shown. As FLC a chiral smectic liquid crystal is employed to exhibit a hysteresis between a pair of substrates which have easy polarization axes normal to each other. Information to be recorded are written on the disc in terms of a binary system by use of the hysteresis. A ferroelectric layer contiguous to the liquid crystal makes the nonvolatility of the memory sure.

16 Claims, 5 Drawing Sheets

LIQUID CRYSTAL MEMORY DEVICE INCLUDING AN ORGANIC FERROELECTRIC LAYER

RELATED APPLICATION

This application is a continuation-in-part of copending application Ser. No. 07/302,104 filed Jan. 25, 1989 now abandoned, which in turn is a continuation of application Ser. No. 06/894,279 filed Aug. 7, 1986, now abandoned.

BACKGROUND OF THE INVENTION

1. Field of the Invention

This invention relates to an optical disc memory which employs a liquid crystal made of optical molecules, possessing an electric dipole density.

2. Brief Description of Prior Art

As an optical disc device there is known a non-rewritable digital disc memory device that utilizes the reflecting conditions of laser light from an uneven reflecting surface, as represented by the compact disc. This application is being considered that will become very promising in the future, not only for audio and video uses, but also for an optical disc memory for information processing. However, a disadvantage of the disc memory is that it is not possible to be rewritten. For this reason, systems that permit rewriting had been in demand, and as such a product there is known the magneto-optic memory device. In addition, there is also known an optical disc memory device of amorphous semiconductor type that employs a chalcogen series (tellurium series).

However, disc devices that employ magneto-optic memory use rare materials and are extremely expensive so that people are apprehensive of their mass production in the future. Moreover, the light control for the method that employs chalcogen series amorphous semiconductor is extremely delicate.

Because of these, there have been sought means that possess such features as the use of materials that can be mass produced, facilitating in turning on and off lights, possession of nonvolatility, and nonconsumption of external energy in storing the memory.

SUMMARY OF THE INVENTION

It is, therefore, an object of the invention to provide an optical disc memory with a liquid crystal.

It is another object of the invention to provide an erasable and rewritable optical disc memory.

It is a further object of the invention to provide an optical disc memory of which recording system can be designed simply and economically.

It is a further object of the invention to provide an improved information recording system with high erasing speed and high writing speed. It is a further object of the invention to provide a nonvolatile optical disc memory.

In order to accomplish the above and other objects and advantages, the inventor has employed a liquid crystal which exhibits a hysteresis in cooperation with means for giving to the liquid crystal a lagging in optical characteristics when external electric field is removed. With this hysteresis, a nonvolatile binary cell capable of being rewritten is prepared.

PREFERRED EMBODIMENTS OF THE INVENTION

Figure 1:
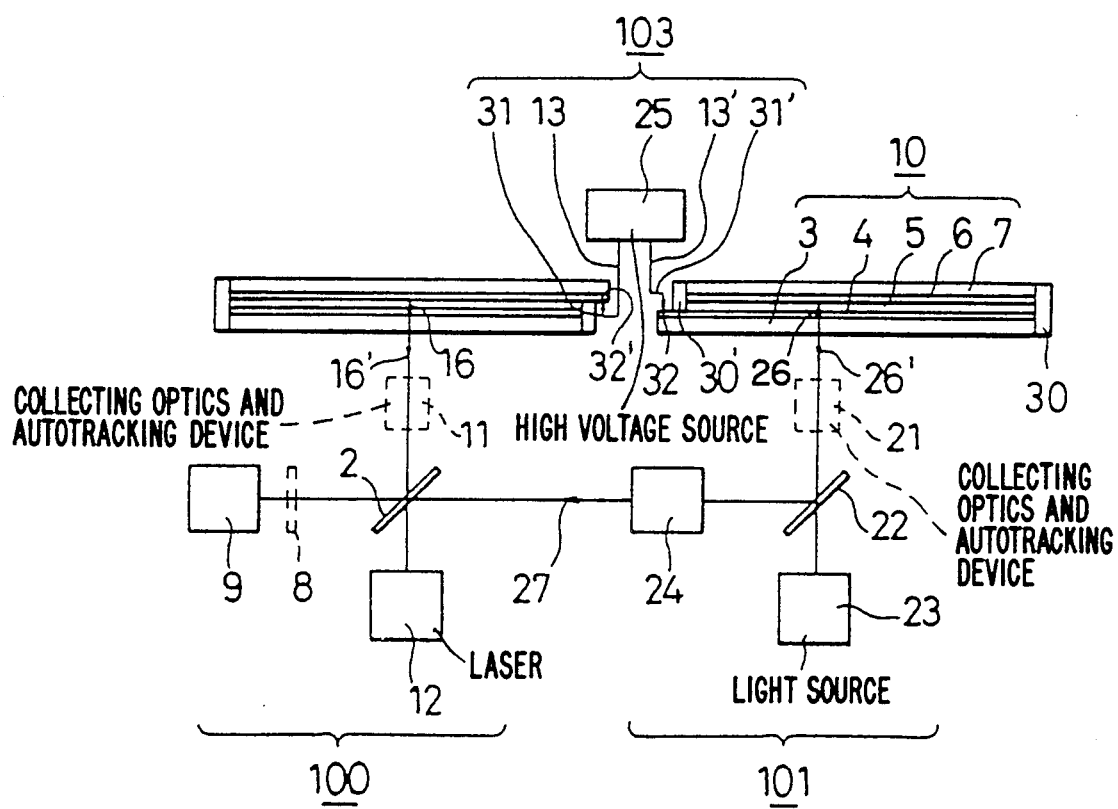
FIG. 1 is a cross-sectional view of an embodiment.

Referring to FIG. 1, an embodiment of the invention is shown.

A first system 100 is for "reading" information, a second system 101 is for "writing" information and third system 103 is for "erasing" information. Reference 10 designates an optical disc.

The optical disc has two disc substrates 3 and 7 opposed to each other. At least one of the substrates, the substrate 3 in the figure, is light transmitting. On the insides of the two, there are provided electrodes 4 and 6 respectively. Here, the electrode 4 provided on the substrate 3 must be light transmitting and the electrode 6 on the substrate 7 must be reflective. Moreover, at least one of the substrates 3 and 7 is formed with the inside surface thereof having an orienting capability, as discussed below. The substrates 3 and 7 are separated from each other by a 4 μm distance with spacers (not shown). Between the substrates 3 and 7, a ferroelectric liquid crystal (FLC hereafter), such as smectic C*, is disposed. The disposing process is carried out with the hot liquid crystal in a smectic A phase. In so doing, the FLC molecules are aligned and formed into a plurality of molecular layers perpendicular to the substrates at room temperature, according to the oriented inner surface of the substrate, and get a stability.

The inner and outer peripheries of the optical disc are sealed off by sealing members 30 and 30' to shut out FLC from making contact with air. On the inner periphery side of the optical disc 10, there are provided contacts 32 and 32' that are formed extending from the pair of electrodes 4 and 6 for applying voltage between the electrodes.

The optical disc will be described in more detail in the following:

Namely, for the substrate 7 use was made of plastic or Corning 7059 glass. On this substrate there was formed a reflective electrode 6 of aluminum by vapor deposition in vacuum. The opposing electrode 4 was prepared by forming a light-transmitting conductive film on the transparent substrate 3 of plastic or glass. As the light transmitting conductive film use was made of ITO (indium-tin oxide). Then, on the inside of electrode 4, there is provided an orienting film (not shown) of PAN (polyacryl-nitryl) and PVA (polyvinyl-alcohol) by spinning method to a thickness of 0.1 μm. FLC 5, e.g. S8 (octyl-oxy-benzylideneamyno-methyle-butyl-benzoate) of thickness 1.5 μm, was sandwiched by the electrodes. A number of spacers are interposed between the pair of substrates to reinforce the disc memory.

To the inner surface a known rubbing treatment is given. For example, a cylinder covered with nylon film is rotated in a rubbing device at 900 RPM and the inner surface of the film to be oriented undergoes the treatment of the rubbing device by moving the substrate at a speed of 2 m/min. in the rotational direction of the disc. In this embodiment, DOBAMBC or a blending of a plurality of FLCs may also be used as FLC to be filled in the disc instead of S8. Some examples are shown by J. W. Goodby et al., "Ferroelectrics Switching in the Tilted Smetic Phase of R-C-3-4-n-Hexyloxydenzylidene 4'-Am'no-(2-Chloropropyl) (innamate (HOBACPC))", Ferroelectric 1984, Vol. 59, pp. 126-136, Japanese Patent Published Applications Nos. sho 59-98051 and 118744.

As an FLC confined in the disc, a chiral smectic C liquid crystal is used. Between the two substrates 3 and 7 FLC has a molecular structure composed of a plurality of laminated layers each perpendicular to the substrates 3 and 7. In each layer, the molecules of the liquid crystal tend to be arranged in the same attitude having a ferroelectric polarization P (electric dipole moment) normal to the long axis of the liquid crystal molecule and laying on the layer. The long axes spontaneously make a certain tilt angle with the layer normal. Accordingly, the dipole moments of the molecules will be perpendicular to the substrates 3 and 7.

Figure 2A:
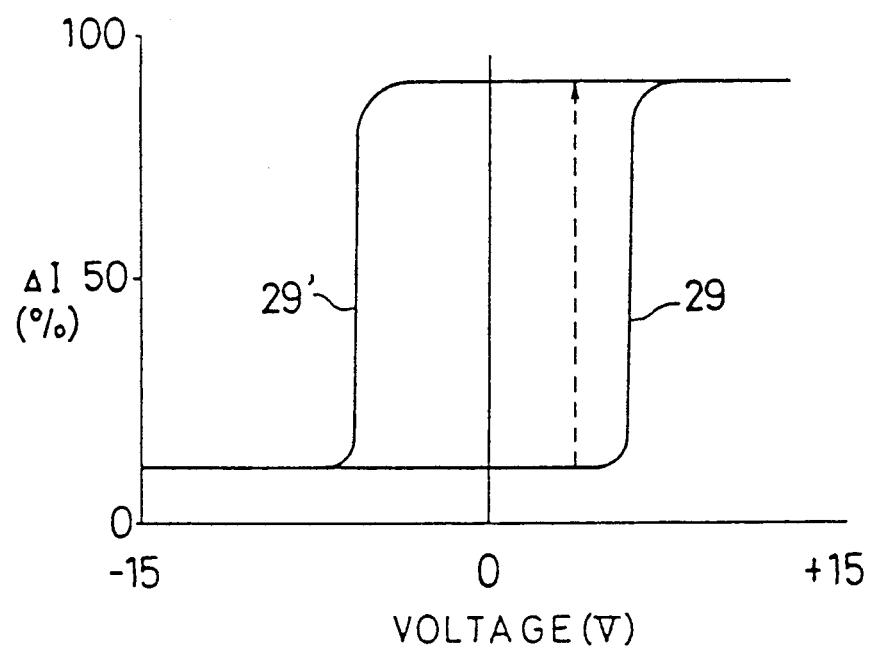
FIGS. 2(A) and 2(B) are graphical diagrams showing electro-optical characteristics of the embodiment.

FIG. 2(A) shows a light transmissivity versus a voltage across the liquid crystal in reference to duly polarized light incident on FLC between the substrates 3 and 7. By means of the contiguous surface of the substrate to FLC, FLC exhibits hysteresis. Namely, when $+15V$ (or $3 \times 10^4 V/cm$) is applied between the electrode, FLC appears transparent having the electric polarization (referred to as having the "up" dipoles hereinafter). On releasing application of the voltage, the transparency of FLC remains as it was. On the other hand, an application of reverse voltage, e.g. $-15$, transforms the condition of FLC into an opaque condition having the opposite electric polarization (the "down" dipoles, hereinafter). This opaque condition can be observed even after the applied voltage is increased to a forward voltage provided that the forward voltage is less than the coercive voltage Ec.

Figure 2B:
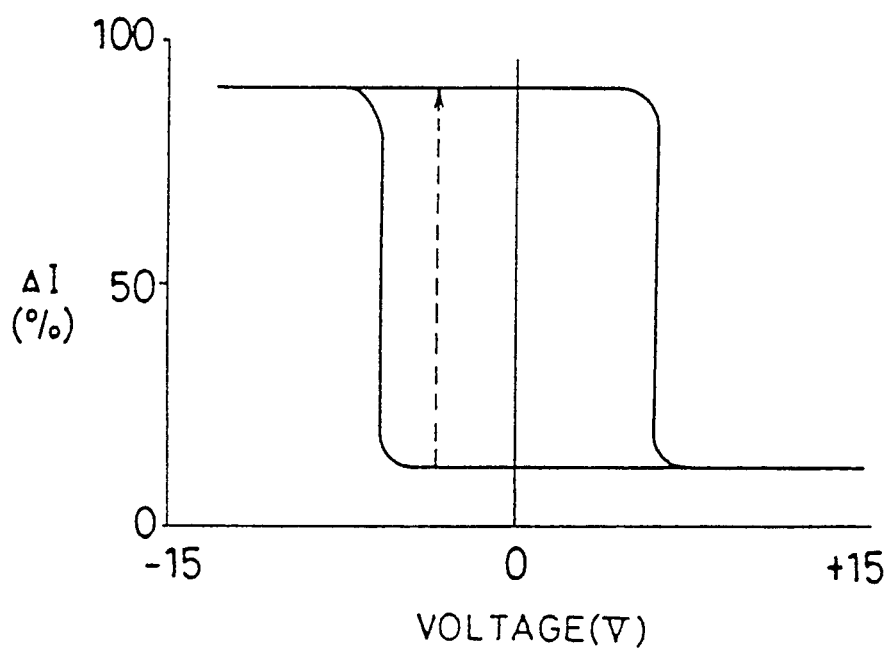

Having increased from $-15v$ to a certain forward level less than the coercive voltage Ec, the applied voltage becomes to favor the "up" dipole although FLC has yet held the "down" dipoles by virtue of the contiguous surfaces of the substrates. Some suitable external disturbance such as a light beam can inverse the dipoles of the molecules from "down" to "up" as shown in FIG. 2(A) with a broken line. In this embodiment, some domains of FLC are irradiated with a light beam, especially of infrared ray, to be reversed selectively. In the following, the condition with the "up" dipole is referred to as "0" state and the condition with the "down" dipole as "1" state. FIG. 2(B) shows the characteristics of FLC with respect to light incident thereon polarized on the plane of polarization normal to that of FIG. 2(A).

Now the explanation of how information is written on or erased from the above described disc memory is in order.

In the erasing system 103, the electrodes for external contacts 32 and 32' are connected to the terminals 31 and 31' of the leads 13 and 13' that are taken out from a high voltage source 25 to carry out "erasing". A sufficient voltage is applied between the opposing electrodes 4 and 6 to arrange FLC molecules in one direction, referred to as "0" state, entirely throughout the disc.

With this condition of the disc, "writing" of information will be carried out for the disc by the use of the system 101. Namely, "writing" is carried out by irradiating a prescribed address of FLC whose molecule are arranged in one direction throughout its surface, with a light beam 26 under application of weak voltage less than Vc. If one wavelength is 1-3 $\mu m$, FLC can absorb a large part of the light energy. The appropriate wavelength depends on the applied voltage. For example, 10V versus 1.2 $\mu m$ or 6V versus 2 $\mu m$ are suitable. In so doing, information is being recorded on the disc in terms of a binary system.

The light beam 26 is radiated from a light source 23 through a half-mirror 22 and a system 21 such as a collecting optics and an autotracking device. After being reflected from the disc, reflected light beam 26' further reaches a photosensor 9 via the mirror 22 and a light intensity controller 24 whereby the reflected light 26' is monitored.

Next the reading process will be described. A light beam emitted from a semiconductor laser 12 impinges, after passing through a half-mirror 2 and a system 11, such as a collecting optics and an autotracking device, upon the optical disc 10 as a beam 16. Then, the light is reflected from the disc 10 as a beam 16', its path is split by the half-mirror 2, and reaches the light-receiving sensor 9 via a polarizing plate 8.

According to the sense of the liquid crystal on which the light is incident, the reflected light is polarized either on a parallel plane or unparallel plane to the plane of polarization of the plate 8. Although, if the tilt angle of the liquid crystal is 45°, the light incident on the plate 8 has been polarized on parallel or normal plane to the polarizing plane of the plate 8, the polarization by the liquid crystal is occasionally not satisfactory because the liquid crystal, even with complete regular arrangement of molecules with the same attitude, is necessary to polarize light wave completely. To enhance the polarizing power of such a liquid crystal, some additive is available so that the molecules of the additive are interposed and oriented between the molecules of the liquid crystal. The additive functions as a polarizer in cooperation with the liquid crystal while the liquid crystal determines the sense of attitude to be taken by molecules of itself and the additive. For example, as an additive, a dichromatic substance such as anthraquinone dye or azo-compound are effective. The polarizing power is attributed to an absorption anisotrophy.

Figure 3:
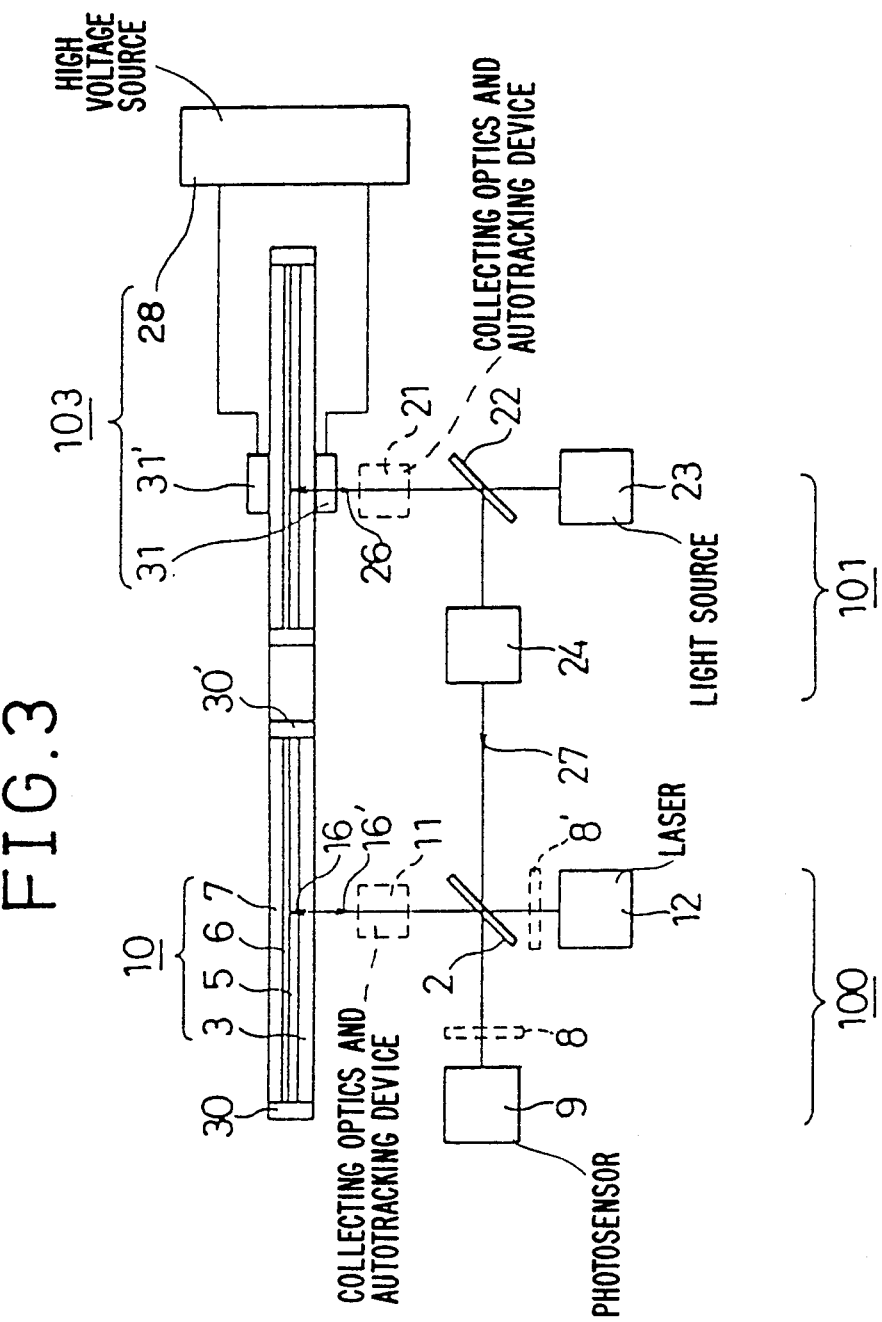
FIG. 3 is a cross-sectional view of another embodiment.

Another embodiment is shown in FIG. 3. In the figure, the construction is the same as in the foregoing embodiment except for the electric field applying method, and therefore redundant explanations are not repeated.

In this case, a voltage is applied, for the optical disc 10, directly to a pair of electrodes 41 and 41' from a high voltage source 28 on the outside, in order to impress a prescribed electric field on FLC. The electrodes 41 and 41' are proximately close to the optical disc 10. Although, in the figure, the electrodes 41 and 41' have a length which is only a fraction of the radius of the disc, they may have a length equal to the radius. In the former case, electric power consumption is reduced. In the latter case, dispensed with is a means for radially scanning the disc 10 with the electrodes 41 and 41' from outside toward inside, or vice versa, of the disc 10, and it is possible to erase the entire surface of the disc with one rotation of the disc 10. According to this further embodiment, the optical disc 10 comprises the pair of substrates 3 and 7, one of which is transmissive and the other of which has a reflective inside, and FLC between the substrates. In the figure, a reflective plate 6 is provided on the substrate 7. Although the reflective plate 6 need not be conductive, use of conductive plate makes it possible to place the electrode 41' apart from the disc.

Referring to FIGS. 4(A) through 4(D), further embodiments are shown. In these embodiments, an optical disc is further comprised of ferroelectric layers 35 and/or 35' in addition to the optical disc described in the above embodiments. The ferroelectric layer may be made of a copolymer prescribed by mixing vinylidenefloride ($CH_2CF_2$), called VDF, with trifluoroethylene, called TrFE. For example, an amount of copolymer between 65 VDF parts and 35 TrFE parts is thinned by methyl-ethyl-keton at 10% weight and then applied on the disc at 100 angstroms by the known spinning method.

Figure 4A:
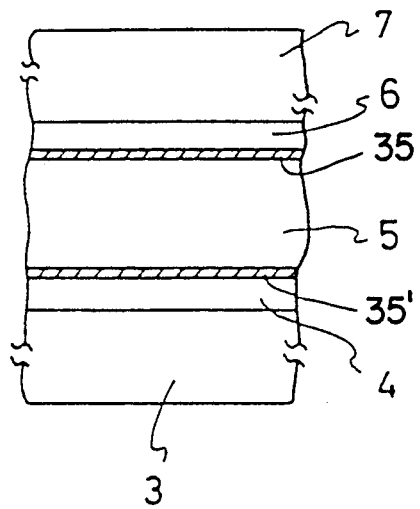
FIGS. 4(A) through 4(D) are partial cross-sectional views showing further embodiments.

As stated above, the disc memory illustrated in FIG. 4(A) is provided with ferroelectric layers 35 and 35' on the electrodes 6 and 4 respectively. The ferroelectric layer 35' is made of a copolymer having a content ratio 52/48 in place of the above 65/35 while the ratio of layer 35 is 65/35. Further, the layer 35' is treated with the known rubbing method to prepare an oriented surface thereon.

Figure 4B:
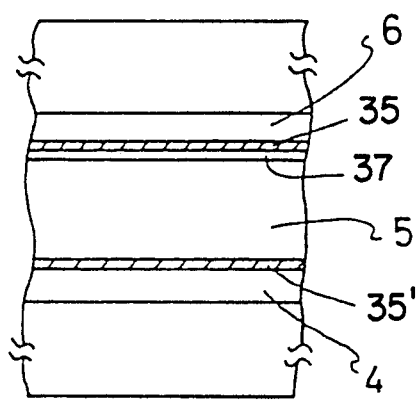
Figure 4C:
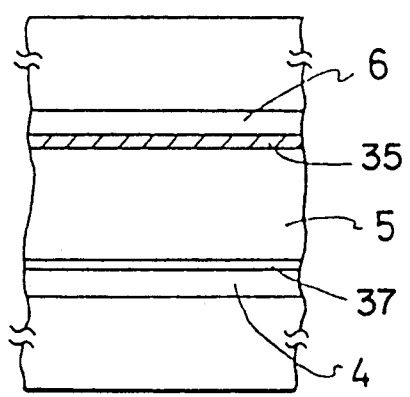
Figure 4D:
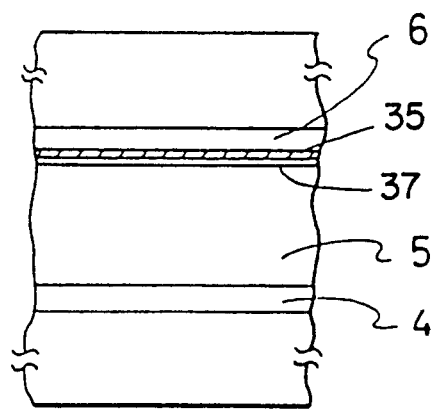

In FIG. 4(B), instead of giving a rubbing treatment to the ferroelectric layer 35', a polyimide resin film 37 may be formed on the ferroelectric layer 35. In such a case, the polyimide film 37 needs to be given a rubbing treatment. The effect of these embodiments can also be enjoyed even if only one ferroelectric layer is employed with the liquid crystal layer 5, which is shown in FIGS. 4(C) and (D). The oriented resin film 37 may be placed either on the electrode 4 (FIG. 4(C)) or on the ferroelectric layer 35 (FIG. 4(D)).

Although only a few exemplary embodiments of this invention have been described in detail above, those skilled in the art will readily appreciate that many modifications are possible in the exemplary embodiments without materially departing from the novel teaching and advantages of this invention. For example, a polarizing plate 8' can be placed between the half-mirror 2 and the laser 12 instead of the plate 8. In this modification, the light incident on the disc is polarized in advance in favor of one of the bistable conditions.

In the embodiments of the present invention, a ferroelectric liquid crystal layer is utilized because of its bistability. However, since a ferroelectric layer 35 is utilized in the liquid crystal devices as shown in FIGS. 4(A) to 4(D), the devices can have memory characteristics even if the liquid crystal layer is not ferroelectric. Namely, other liquid crystals can be utilized instead of the ferroelectric liquid crystal to form a liquid crystal device having a memory property, for example, polymer dispersed liquid crystal (PDLC), TN liquid crystals, STN liquid crystals or the like.

In the case of the polymer dispersed liquid crystals, nematic, cholesteric, or smectic liquid crystal is enclosed in a lot of capsules by a solid polymer and are coated on a substrate in the form of a film. The polymer is for example, gelatin, gum arabic, polyvinylalcohol or the like. The liquid crystal molecules in each capsule are oriented along with an applied electric field if the molecules have a positive dielectric anisotropy. And if the refractive index of the liquid crystal is the same as that of the polymer, the film exhibits a transparent state. On the other hand, in the case that no electric field is applied, the molecules are oriented in various directions and the refractive index of it becomes different from that of the polymer so that the incident light is scattered in the film and thus the film exhibits a non-transparent state.

In addition to the above example, the liquid crystal may be dispersed in a resin material such as an epoxy resin, also, a liquid crystal may be absorbed in a three dimensionally connected polymer to form other PDLCD. Also, as an example of the polymer dispersed liquid crystal, a mixture of a liquid crystal and a photo-hardened monomer may be utilized. In such a case, a light is irradiated to the mixture so that only the monomer is hardened.

Also, a dye which has an anisotropic property in its color may be added to the liquid crystal for the PDLCD. For example, in the case where a black dye is added, when there is no applied electric field to the liquid crystal, the molecules are directed in various directions so that the light passing through the liquid crystal device is scattered and colored with black. On the other hand, if an electric field is applied, the liquid crystal molecules are oriented along with the field and the light can transmit through the film. At this time, since the dye is also switched together with the liquid crystal molecules, it does not exhibit black and the light is instead colored by a color filter which is provided on a substrate.

Also, as an example of the ferroelectric layer, a copolymer of VDF and TrFE is disclosed in the embodiments. However, other organic ferroelectric layers may be utilized. For example, polyvinylidenfluoride, a copolymer of vinylidenfluoride and tetrafluoroethylene, or a copolymer of vinylidencyanide and vinylacetate may be used.

I claim:

1. A liquid crystal device having a memory property comprising:
   a pair of organic ferroelectric layers; and
   a liquid crystal layer interposed between said layers.

2. The device of claim 1, wherein said ferroelectric layers are supported by at least one substrate.

3. The device of claim 1 further comprising at least one electrode arrangement formed adjacent to one of said ferroelectric layers.

4. The device of claim 1, wherein said ferroelectric layers comprise a copolymer of vinylidenfluoride and a trifluoroethylene.

5. A liquid crystal device having a memory property comprising:
   a pair of organic ferroelectric layers;
   a liquid crystal layer interposed between said ferroelectric layers; and
   at least one orientation control film formed on one of said ferroelectric layers.

6. The device of claim 5, wherein said ferroelectric layers are supported by at least one substrate.

7. The device of claim 5 further comprising at least one electrode arrangement formed adjacent to one of said ferroelectric layers.

8. The device of claim 5, wherein said ferroelectric layers comprise a copolymer of vinylidenfluoride and a trifluoroethylene.

9. A liquid crystal device having a memory property comprising a liquid crystal layer formed contiguous to an organic ferroelectric layer.

10. The device of claim 9 wherein said liquid crystal layer and ferroelectric layer are supported by at least one substrate.

11. The device of claim 9 further comprising at least one electrode arrangement formed on at least one outside surface of said layers.

12. The device of claim 9, wherein said ferroelectric layers comprise a copolymer of vinylidenfluoride and a trifluoroethylene.

13. A liquid crystal device having a memory property comprising:

an organic ferroelectric layer;

an orientation control film formed on said ferroelectric layer; and a liquid crystal layer formed contiguous to said orientation control film.

14. The device of claim 13 supported by at least one substrate.

15. The device of claim 13 further comprising at least one electrode arrangement formed adjacent to said ferroelectric layer.

16. The device of claim 13, wherein said ferroelectric layers comprise a copolymer of vinylidenfluoride and a trifluoroethylene.

* * * * *